Oct. 18, 1927.
I. ANDREWS
LOOM HARNESS
Filed April 7, 1927
1,645,572
Fig.1.
Fig.2.
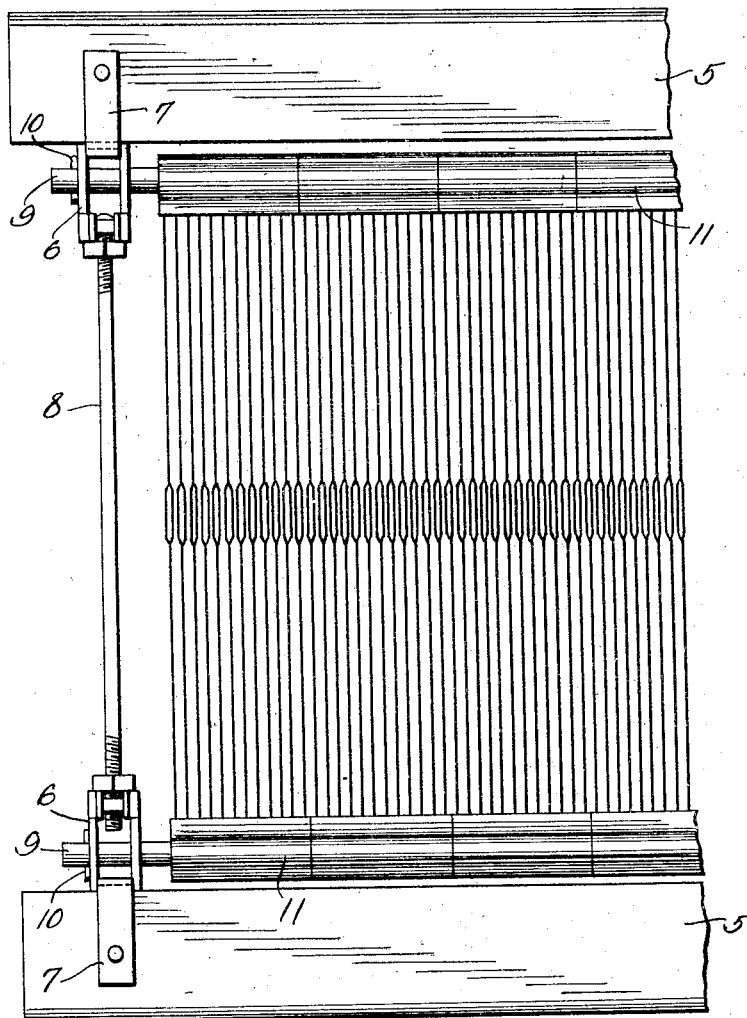
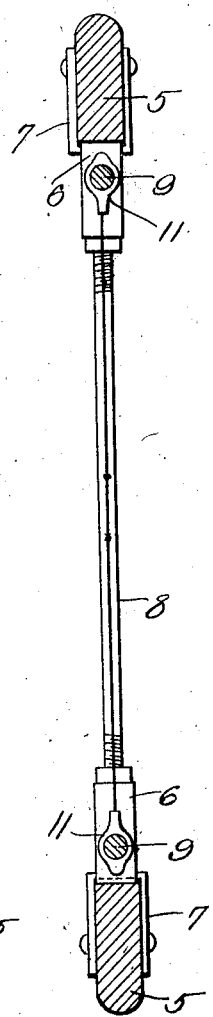
Fig.3.
Inventor
Isaac Andrews
By C.A.Snow&Co.
Attorneys Patented Oct. 18, 1927.

1,645,572

UNITED STATES PATENT OFFICE.

ISAAC ANDREWS, OF SPARTANBURG, SOUTH CAROLINA.

LOOM HARNESS.

Application filed April 7, 1927. Serial No. 181,834.

This invention has reference to loom harness and more particularly to the construction of the twine, of which the eyes are formed.

The primary object of the invention is to provide a twine harness made up of a plurality of sections, novel means being provided for supporting the sections and securing the sections to the loom harness shaft so that the sections may be readily and easily removed or replaced, to vary the width of the twine harness.

An important object of the invention is to so construct the upper and lower ends of the sections of the twine harness that they will be firmly supported, the structure being such as to protect the upper and lower ends of the twine harness against wear by its contact with its supporting rods.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental elevational view illustrating a twine harness and means for supporting the twine harness.

Figure 2 is a longitudinal sectional view through the harness.

Figure 3 is an enlarged detail sectional view illustrating the tubular members at the ends of the sections.

Referring to the drawing in detail, the reference character 5 designates loom harness shafts, which are held in spaced relation by means of the yokes 6 secured to the shafts by the U-shaped straps 7, the yokes of the harness shafts being connected by means of the rods 8, disposed at the ends of the shafts, one of these rods being shown in the present drawing.

The yokes 6 are formed with openings to accommodate the rods 9 to which the sections of the twine harness are secured, the rods 9 being provided with cotter pins 10 at their ends for holding the rods in position, it being obvious that by removing the cotter pins, the rods may be readily and easily disconnected from the yokes 6, and the sections of the twine harness slid thereover.

Each section of the twine harness is formed by the usual and well known knitting process, the twine at the ends of the harness being formed into eyes by moving alternate strands of the wire laterally as shown by Figure 3, and finally vulcanizing rubber around these eyes defining tubular portions 11 having a certain amount of resiliency to relieve the twine, to a degree, of undue wear caused by the movement of the harness, while in use.

It might be further stated that the tubular members formed in a manner as described, are of diameters to closely engage the rods over which the tubular members are positioned.

As shown, the vulcanized rubber extends over the twine to protect that portion of the twine adjacent to the loops and lend resiliency thereto.

From the foregoing it will be seen that due to this construction, a loom harness of the twine type may be adjusted to various widths by adding to, or removing sections from the supporting rods, as the case may be, thereby eliminating the necessity of an operator carrying in stock harness of various widths to accomplish the weaving of cloth of various widths.

I claim:—

1. In a loom harness, harness shafts, rods supported in spaced relation with the shafts, a sectional twine harness, tubular members connected to the ends of each section, and said tubular members adapted to be fitted over the rods to removably secure the sections to the rods.

2. In a loom harness, harness shafts, supporting rods, means for removably connecting the supporting rods to the harness shafts, a sectional twine harness, rubber tubular members formed at the ends of the sections, and said tubular members adapted to be positioned over the rods.

3. In a loom harness, supporting rods, a sectional twine harness, tubular members formed at the ends of the sections, said tubular members being formed of elastic material, and said tubular members adapted to be fitted over the rods to removably secure the sections to the rods.

4. In a loom harness, harness shafts, supporting rods arranged in spaced relation with the shafts, a sectional twine harness mounted on the shafts, tubular members formed of rubber and in which the ends of the twine are embedded, and said tubular members adapted to be positioned over the rods to removably connect the sections to the rods.

In testimony that I claim the foregoing as my own, I have hereto affixed my signature.

ISAAC ANDREWS.